(12) United States Patent
Subbulu

(10) Patent No.: US 6,656,561 B1
(45) Date of Patent: Dec. 2, 2003

(54) COMPOSITE SOLID SURFACE ARTICLE AND PROCESS FOR PRODUCING THE SAME

(76) Inventor: Vangala Bala Venkata Subbulu, c/o Mr. T.S.R.K. Lohit, 1/24 Sarvapriya Vihar, Near Panchsheel Park, New Delhi 110 016, Maharashtra (IN)

( * ) Notice: Subject to any disclaimer, the term of this patent is extended or adjusted under 35 U.S.C. 154(b) by 0 days.

(21) Appl. No.: 09/806,774

(22) PCT Filed: Aug. 9, 1999

(86) PCT No.: PCT/IN99/00035

§ 371 (c)(1),
(2), (4) Date: May 30, 2001

(87) PCT Pub. No.: WO01/10639

PCT Pub. Date: Feb. 15, 2001

(51) Int. Cl.[7] ............................ B32B 27/08; B32B 1/04; B32B 27/20; B32B 27/36; B29C 63/00
(52) U.S. Cl. ............................ 428/77; 428/45; 428/68; 428/78; 428/79; 428/81; 428/192; 428/195; 428/413; 428/480; 428/482; 428/483; 428/537.1; 264/544; 264/241; 264/245; 264/246; 264/247; 264/250; 264/252; 264/255; 264/259; 264/271.1; 264/275; 264/277; 264/279; 264/279.1; 264/318
(58) Field of Search ................................. 428/413, 480, 428/483, 481, 537.1, 482, 45, 68, 76, 77, 78, 79, 81, 119, 120, 192, 195; 264/560, 544, 239, 241, 259, 262, 263, 271.1, 271.11, 272.15, 275, 277, 279, 279.1, 245, 246, 247, 318, 250, 252, 255

(56) References Cited

U.S. PATENT DOCUMENTS

| 3,609,114 A | * | 9/1971 | Bright, Sr. ............. 260/998.17 |
| 3,627,864 A | * | 12/1971 | Doubleday .................. 264/112 |
| 4,323,615 A | | 4/1982 | Sauder ........................ 428/121 |
| 4,734,469 A | * | 3/1988 | Takiyama et al. ........... 525/529 |
| 5,628,949 A | * | 5/1997 | Bordener .................... 264/161 |
| 5,868,957 A | * | 2/1999 | Bordener ................. 249/114.1 |
| 5,885,503 A | * | 3/1999 | Bordener .................... 264/254 |
| 5,906,875 A | * | 5/1999 | Bordener ....................... 428/81 |
| 6,113,199 A | * | 9/2000 | Foote .......................... 108/90 |
| 6,251,323 B1 | * | 6/2001 | Hoedl et al. ................ 264/254 |

FOREIGN PATENT DOCUMENTS

| DE | 3817224 A1 | 11/1989 |
| DE | 29807994 U1 | 9/1998 |
| JP | 58-134740 | 8/1983 |

* cited by examiner

Primary Examiner—Vivian Chen
(74) Attorney, Agent, or Firm—Venable LLP; Marina V. Schneller

(57) ABSTRACT

A composite solid surface article which includes a molded overlay composed of a solid surface material fabricated in a mold; an underlay core material composed of a polymeric material molded onto the overlay but which only covers a center portion of the overlay so that peripheral edges of the overlay are not covered by the underlay core material; and solid surface edge component of additional solid surface material at the edge of the underlay core material, and a method of making the composite using a removable liner.

15 Claims, No Drawings

COMPOSITE SOLID SURFACE ARTICLE AND PROCESS FOR PRODUCING THE SAME

FIELD OF INVENTION

This invention relates to articles employing solid surface sheets and to a process for producing such articles.

BACKGROUND OF INVENTION

Solid surface articles are those which have colour texture and composition consistent throughout the cross section of the article compared to gelcoated polymer composite articles which are heterogeneous in nature. However, such solid surface articles are expensive in costs.

To make solid surface articles cost effective, it is known to adhere a thinner solid surface material to the upper surface of a particle board and a commercially available water resistant laminate on the lower side. The edges are sealed by pieces of solid surfacing material.

Such an articles does have an aesthetic appearance on one side. However, such an articles has limitations in the application and usage. Further, considerable workshop effort is required to adhere these materials and special adhesives are needed to have durability of adhesion.

OBJECTS OF INVENTION

An object of this invention is to propose solid surface articles which are effective. Another object of this invention is to propose sandwiched solid surface articles which have the appearance of single solid surface material. Yet another object is to propose solid surface articles having improved strength properties. Still another object is to propose effective solid surface articles which are cost effective. A still further object of this invention is to propose a process for producing solid surface articles.

DESCRIPTION OF THE INVENTION

According to this invention there is provided a solid surface article comprising an overlay of solid surface material and an underlay moulded thereto, said underlay being selected from known board materials or a polymer such as polyester with known fillers, said article having its edges with the solid surface material moulded thereto.

Further according to this invention there is provided a process for producing solid surface articles which comprises in the steps of:

a) inserting an inlay material into a mould;
b) pouring a solid surface material into said mould to constitute an overlay;
c) introducing an underlay material to constitute an underlay having dimensions less than the mould by the thickness of edges;
d) filling the space between the mould and underlay material with solid surface material to form solid surface edges and allowing to set to form the article;
e) demoulding the article and subjecting it to the process of finishing.

In accordance with one embodiment of this invention, the underlay or core material is selected from known board materials such as particle board, and a solid surface material is lined on both sides of the underlay such that the underlay is encapsulated within solid surface layers on all sides.

In accordance with a second embodiment, the low cost underlay made out of resins such as polyesters and fillers to form cost effective composite has a solid surface material over lay only on the upper side and on edges.

In accordance with yet another embodiment of the instant invention where the underlay comprises of a low cost board material, the solid surface material is provided as an overlay and at the edges and the exposed composite of surface of the underlay has a lining of said cost effective polyester resin and fillers. All the aforesaid embodiments impart an appearance of a single solid surface lining of a higher thickness.

In the instant invention, as an example of a thickness of ⅛" of solid surface lining is provided on either side of the particle boards of ½" (12 mm) thick or ¾" (18 mm) thick giving an approximate total thickness of the solid surface panel of ¾" or 1". The article of the present invention imparts an appearance of single solid surface lining with high strength. Strength is almost double the strength of current international solid surface material using particle board core as described earlier. In the present invention, a solid surface lining on both sides or solid surface lining on one side and polymer composite lining on the other side is provided during the step of moulding. Hence, no adhesives are required and bonding is positive, unlike in the known methods of producing solid surface articles. This method also provides for savings by in-process ready made edges, in-lays and bowl cut-outs without involving additional manufacturing stages, labour and materials.

This process of the present invention consists in inserting an inlay material into a mould and then pouring a solid surface material to constitute the overlay. An underlay material comprising a board material is introduced over the over lay into the mould and has dimensions less that the mould by the thickness of edges. The space between the mould and underlay material is filled with solid surface material to form solid surface edges and which is then allowed to set to form the article. The article is demoulded and finally subjected to the step of finishing. In the embodiment where the underlay comprises a polymer temporary liners are inserted after pouring of solid surface overlay material. The underlay polymer material is poured into said mould such that formed underlay material has dimensions less than the mould by the thickness of edge obtained by insertion of said temporary liners. The space between the underlay and mould is again filled with solid surface materials to obtain solid surface edges. The temporary liners are removed and the polymer and solid surface material is allowed to set. The article is demoulded and subjected to a process of finishing. In accordance with another embodiment a solid surface material is poured onto the exposed surface of underlay and allowed to set, demould and subject of the steps of finishing. From the above, it can be realised that the process is flexible and offers various options in terms of materials and methods for the production of encapsulated product depending upon end application and market.

| The typical test results of the products are as follows when tested under standard test conditions as per ASTM-D790 & ASTM-D695 | | Compressive Strength Kgs/Cm | Flexural Strength Kgs/Cm |
|---|---|---|---|
| a) | One side Solid Surface layer of 1/8" thick glued to 18 mm particle board and on other side of the particle board 0.5 mm thick water resistant laminate is glued (This is conventional product) | 187.43 | 179.88 |
| b) | The Solid Surface sandwich panel of instant | 352.23 | 306.45 |

-continued

| The typical test results of the products are as follows when tested under standard test conditions as per ASTM-D790 & ASTM-D695 | | Compressive Strength Kgs/Cm | Flexural Strength Kgs/Cm |
|---|---|---|---|
| | invention is having 1/8" Solid, Surface layers on both sides with a core of 12 mm thick particle board. | | |
| c) | Solid Surface sandwich panel of instant invention having 1/8" Solid Surface layers on both sides with a core of 18 mm thick particle board | 326.09 | 192.20 |
| d) | Solid Surface sandwich panel of instant invention having 1/8" Solid Surface layers on both sides with a core of 188 mm thick particle board | 475.53 | 333.84 |

From the above results it is clear that the strength at product 'a' is very low when compared to the strengths of the product b, c & d. Also appearance of the product of the instant invention in b, c & d is much superior when compared to the product 'a'. The product at b, c, d described above will have solid surface edges.

General description of the process is given below: A layer of about ⅛" thick Solid Surface material (typically of Acrylic modified resin, filler such as A T H and other fillers & pigments) is poured, core is inserted which is having dimension lower than mould by the thickness of edge needed. The space between core and mould is again filled with the same or similar material to create solid surface edges. Top of the core is again filled with either same material or cheaper compositions. The core can be of any flat material or shaped material or can be replaced by other resinous composition (typically polyester with fillers like Calcite, Fly Ash. Perlite etc). The product is demoulded, flash is removed and product is finished. It is possible to insert designs into the mould and then fill the Solid Surface material before placing core to get desired inlay effect.

What is claimed is:

1. A composite solid surface article which is an at least partially encapsulated polymeric core material produced by a mold-in-place process, the article comprising:
    a molded overlay comprised of a solid surface material fabricated in a mold;
    an underlay core material which comprises a polymeric material and which is molded onto the overlay in the mold but which only covers a center portion of the overlay so that peripheral edges of the overlay are not covered by the underlay core material; and
    solid surface edges comprised of additional solid surface material and provided around the periphery of the underlay core material to encapsulate the edges of the underlay core material by molding in the mold,
    wherein the underlay core material is formed using temporary liners which are inserted into the mold and located to define peripheral edge regions having a preselected thickness.

2. The composite solid surface article according to claim 1, further comprising a lining provided on the exposed surface of the underlay core material in the mold so that the composite solid surface article is a completely encapsulated polymeric core material produced by a mold-in-place process.

3. The composite solid surface article according to claim 2, wherein the lining is comprised of one of the solid surface material or a polymer composite material.

4. The composite solid surface article as claimed in claim 1, further comprising an inlay material having a pattern onto which the molded overlay is provided.

5. The composite solid surface article as claimed in claim 1, wherein the solid surface material is a mixture comprised of acrylic-modified resins and at least one of fillers and pigments.

6. The composite solid surface article as claimed in claim 5, wherein the fillers include at least one filler material selected from the group consisting of aluminum trihydrite (ATH) and colored fillers.

7. The composite solid surface article as claimed in claim 1, wherein the underlay core material is a mixture of polyester resin and at least one cost-effective filler selected from the group consisting of fly ash, perlite, and calcite.

8. A process for producing a composite article which is an at least partially encapsulated polymeric core material produced by a mold-in-place process, the process comprising the steps of:
    pouring a solid surface material into a mold to provide a molded overlay;
    introducing temporary liners around the periphery of the mold and locating the temporary liners to obtain a preselected edge thickness;
    pouring an underlay core material comprised of a polymeric material onto the molded overlay;
    pouring additional solid surface material into the peripheral edge space to provide solid surface edges around the underlay core material;
    allowing the polymeric core material and the solid surface material to set and provide the composite solid surface article; and
    demolding the composite solid surface article and subjecting the composite solid surface article to finishing.

9. The process as claimed in claim 8, further comprising providing a lining on the exposed surface of the underlay core material in the mold so that the composite solid surface article is a completely encapsulated polymeric core material produced by a mold-in-place process.

10. The process as claimed in claim 8, further comprising providing an inlay material having a pattern in the mold prior to pouring a solid surface material into a mold to provide the molded overlay.

11. The process as claimed in claim 8, further comprising providing a solid surface material for the molded overlay which is a mixture of an acrylic-modified resin and at least one of filler, and pigments.

12. The process as claimed in claim 11, wherein the fillers are selected from the group consisting of aluminum trihydrate (ATH) and colored fillers.

13. The process as claimed in claim 8, further comprising providing an underlay core material which is a mixture of a polymer and at least one cost-effective filler selected from the group consisting of fly ash, perlite, calcite.

14. The process as claimed in claim 13, wherein the polymer is a polyester resin.

15. The process as claimed in claim 8, which further comprises locating the temporary liners to obtain a preselected edge thickness molded overlay to completely cover the underlay core material at the edges.

* * * * *